United States Patent
Hölzl

(10) Patent No.: US 9,605,951 B2
(45) Date of Patent: Mar. 28, 2017

(54) APPARATUS AND METHOD FOR DETERMINING THE TARGET POSITION DEVIATION OF TWO BODIES

(71) Applicant: Prüftechnik Dieter Busch AG, Ismaning (DE)

(72) Inventor: Roland Hölzl, München (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 216 days.

(21) Appl. No.: 14/676,766

(22) Filed: Apr. 1, 2015

(65) Prior Publication Data
US 2016/0223320 A1   Aug. 4, 2016

(30) Foreign Application Priority Data
Feb. 4, 2015 (EP) ..................... 15153745

(51) Int. Cl.
| | | |
|---|---|---|
| *G01B 11/14* | (2006.01) | |
| *G01B 11/27* | (2006.01) | |
| *G01B 11/26* | (2006.01) | |

(52) U.S. Cl.
CPC ............ *G01B 11/272* (2013.01); *G01B 11/14* (2013.01); *G01B 11/26* (2013.01); *G01B 11/27* (2013.01)

(58) Field of Classification Search
USPC .... 356/237.1–241.6, 242.1–243.8, 426–431, 356/600–640
See application file for complete search history.

(56) References Cited

U.S. PATENT DOCUMENTS

| | | | | |
|---|---|---|---|---|
| 3,474,255 A | * | 10/1969 | White ................. | G01D 5/345 250/225 |
| 4,518,855 A | * | 5/1985 | Malak ................. | G01B 11/272 250/203.1 |
| 4,698,491 A | * | 10/1987 | Lysen ................. | G01B 11/272 250/559.3 |
| 4,709,485 A | * | 12/1987 | Bowman ............. | G01B 11/272 33/228 |

(Continued)

FOREIGN PATENT DOCUMENTS

| | | |
|---|---|---|
| WO | 00/28275 A1 | 5/2000 |
| WO | 03/067187 A1 | 8/2003 |

OTHER PUBLICATIONS

EP15153745, European Search Report, Apr. 23, 2015.

*Primary Examiner* — Tri Ton
*Assistant Examiner* — Jarreas C Underwood
(74) *Attorney, Agent, or Firm* — Millman IP Inc.

(57) ABSTRACT

The invention relates to an apparatus (8) for detecting a target position deviation of two bodies (10, 12), with a first measuring unit (14) for placement on the first body (10), a second measuring unit (18) for placement on the second body (12), and an evaluation unit (22). The first measuring unit (14) has means (24) to generate at least one bundle of light beams (28) and a scattering area (34) to scatter light (WV, PV) striking the scattering area, and the second measuring unit (18) has a reflector arrangement (38) to reflect the bundle of light beams (28) onto the scattering area (34). The second measuring unit (18) has a camera (36) to record images of the scattering area (34). The evaluation unit (22) is configured so as to detect from the images a deviation in target position of the bodies (10, 12). The invention additionally relates to a method to detect the deviation in target position.

13 Claims, 4 Drawing Sheets

(56) References Cited

U.S. PATENT DOCUMENTS

Figure 1:
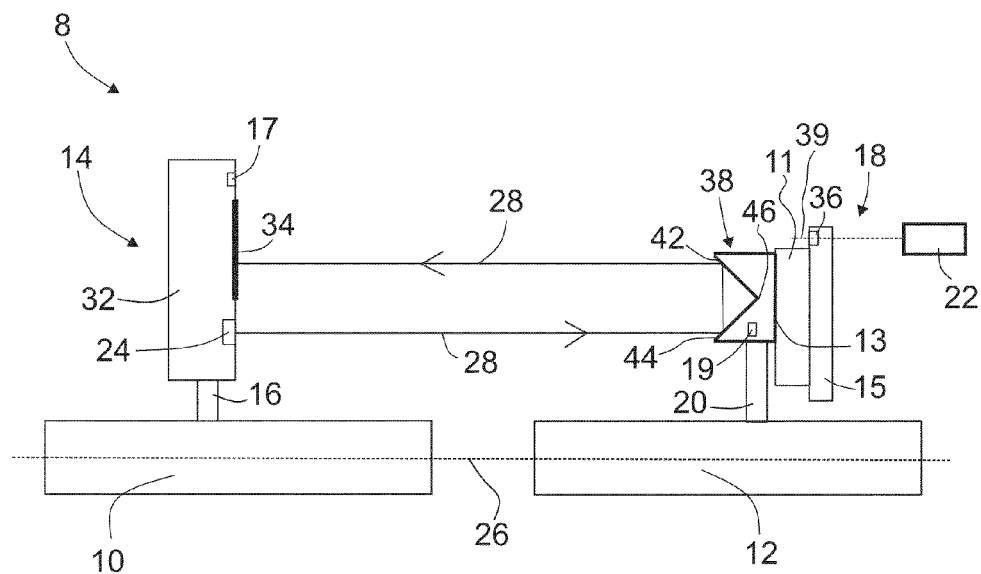

| | | | |
|---|---|---|---|
| 6,411,375 B1 * | 6/2002 | Hinkle | G01B 11/272 33/286 |
| 6,476,914 B1 * | 11/2002 | Hoelzl | G01B 11/26 250/208.2 |
| 6,873,931 B1 | 3/2005 | Nower et al. | |
| 7,242,465 B2 * | 7/2007 | Lacko | G01B 11/272 33/412 |
| 8,533,965 B2 * | 9/2013 | Stromberg | G01B 11/27 33/412 |
| 9,080,862 B2 * | 7/2015 | Weihrauch | G01B 11/272 |
| 9,146,101 B2 * | 9/2015 | Canu | G01B 11/272 |

* cited by examiner

APPARATUS AND METHOD FOR DETERMINING THE TARGET POSITION DEVIATION OF TWO BODIES

The invention relates to an apparatus and a method for detecting the target position deviation of two bodies, with a first measuring unit to be placed on the first body, a second measuring unit to be placed on the second body, and an evaluation unit.

Such an apparatus may alternatively or additionally also be designed to be used to determine the orientation of two bodies, in particular shafts, relative to one another.

In devices of the type described above, at least one of the two measuring units typically has a light source to generate a light beam, the point of impact of which is determined on one or more detectors on the other measuring unit, or on a detector on the measuring unit equipped with the light source, wherein in the latter case the other measuring unit reflects the light beam. Typically, in order to determine the orientation of the bodies—e.g. shafts—relative to one another, the position of the point of impact of the light beam is determined at various rotational angular positions. To accomplish this, the measuring units are moved along the circumferential surfaces of the shafts, or the shafts are rotated with the measuring units placed on the circumferential surfaces.

In DE 33 20 163 A1 and DE 39 11 307 A1, shaft position measurement apparatuses are described in which the first measuring unit emits a light beam which is reflected back to an optical detector on the first measuring unit by a mirror prism of the second measuring unit.

In DE 33 35 336 A1, a shaft position measurement apparatus is described wherein both the first and the second measuring unit each emit a light beam, and each have an optical detector, wherein each light beam is projected at the detector on the other measuring unit.

A shaft position measurement apparatus working according to this principle is also described in US 6,873,931 B1, wherein each of the two measuring units is equipped with a pair of dual-axis acceleration sensors for automatic detection of the rotation angle of the shaft.

A shaft position measurement apparatus is known from DE 38 14 466 A1 in which the first measuring unit emits a light beam which strikes two optical detectors arranged one behind the other in an axial direction on the second measuring unit.

A shaft position measurement apparatus is known from WO 03/067187 A wherein the first measuring unit emits a fan-shaped beam which strikes two optical detectors arranged one behind the other in an axial direction on the second measuring unit.

A shaft position measurement apparatus is known from WO 00/28275 A1 in which two measuring units are attached one to each end of the two shafts, wherein the first measuring unit emits a fan-shaped light beam which laterally strikes three marker pins arranged on a plane of the second measurement unit.

In EP 0 962 746 A2, a shaft position measurement apparatus is described in which the first unit has a source for a light beam in a first color, a beam splitter, and a color-sensitive CCD detector, and the second unit has a source for a light beam in a second color and a color splitter (color-selective beam splitter) which reflects the first color and transmits the second; the light source of the second unit is arranged, from the perspective of the first unit, behind the color splitter, and the light source of the first unit is arranged, from the perspective of the second unit, behind the beam splitter. The light beam emitted by the first unit first penetrates the beam splitter of the first unit and is then reflected by the color splitter of the second unit. This reflected beam is in turn reflected at the beam splitter of the first unit to strike the detector. The light beam from the second unit first penetrates the color splitter of the second unit, and is then reflected toward the detector by the beam splitter of the first unit.

In EP 2 093 537 A1, a shaft position measurement apparatus is described wherein the first measuring unit emits a fan-shaped light beam which strikes two optical strip detectors of the second measuring unit arranged laterally in parallel at a distance to one another, and in which the longitudinal direction of the detectors is perpendicular to the plane of the fan-shaped light beam.

In all of the shaft position measurement apparatuses mentioned above, the point of impact of a light beam on a detector surface is determined and evaluated.

Known from DE 40 41 723 A1 is an apparatus for determining the position of a measuring point relative to a reference point for the controlling or management of the forward motion of a drill hole, such apparatus having multiple measuring stations arranged in the drill hole or on the drill head and each having a camera with a marker, wherein each camera records the marker of the neighboring camera or measuring station.

From WO 2010/042039 A1, a shaft alignment measurement apparatus is known in which each of the two measuring units is equipped with a camera positioned in a housing, and wherein the side of the housing facing the other unit is furnished with an optical pattern which is recorded by the opposing camera. The side of the housing bearing the pattern is in each case provided with an opening through which the opposing pattern is projected. In an alternative embodiment, one of the two units is equipped only with a camera, but not with a pattern, while the other unit has no camera, but is provided with a three-dimensional pattern.

EP 1 211 480 A2 describes a shaft alignment measurement apparatus in which the first measuring unit is provided with a light source which directs a light beam at the second measuring unit, which is equipped with a matte screen; the side of the matte screen facing away from the first measuring unit is depicted by means of suitable optics on an image detector which is also a part of the second measuring unit.

In DE 101 43 812 A1 and DE10117390A1, a shaft alignment measuring apparatus is described in which the first measuring unit has a light source to create a fanned out beam and the opposing second measuring unit has a partially reflective optical system with a rearward matte screen as well as a camera which records the side of the matte screen facing away from the first measuring unit with a primary light spot of the beam coming directly from the light source and with a secondary light spot of the beam reflected from the partially reflective optical system of the second measuring unit and a reflector on the front side of the first measuring unit.

A laser receiver with a camera for machine measurement is available from the company Wente CamSorik GmbH, 38108 Braunschweig, Germany, under the trade name Laser-Trac.

An apparatus for determining the position of two mechanical elements or bodies relative to one another is known from EP 2 801 788 A1, in which a first measuring unit for placement on a first mechanical element or a first body of the two mechanical elements or bodies has means for generating at least one bundle of light beams, a scattering area for scattering light striking the scattering area, and a camera for recording images of the scattering area. This known apparatus is additionally or alternatively suited also for detecting or determining the target position deviation of the bodies from a target position. In this known solution, the camera is attached laterally at an angle to the scattering area, respectively the optical axis of the camera is not oriented perpendicularly to the scattering area. A second measuring unit for placement on the second mechanical element or second body has a reflector arrangement that faces the first measuring unit when the measuring units are attached to the relevant mechanical element or bodies in order to reflect the bundle of light beams onto the scattering area. In addition, a processing unit is provided in this known solution that is configured to identify the point of impact of the bundle of light beams reflected from the reflector arrangement onto the scattering area using the image data supplied by the camera and to determine from this the position of the first body and the second body relative to one another, or, additionally or alternatively, to detect or determine the target position deviation of the bodies from a respective target position. In order to determine the center point coordinates of the points of impact, it is necessary that the distortions in perspective of the optical system caused by the orientation of the camera deviating from a perpendicular orientation with regard to the scattering area be corrected, by an intricate process involving a suitable evaluation of the images recorded by the camera.

It is the object of the present invention to offer an apparatus and a method for detecting or determining a target position deviation of two bodies in which the target position deviation can be simply and practically determined on the basis of camera images of the points of impact on a bundle of light beams on a scattering area.

This object is accomplished in accordance with the invention by an apparatus having the features of claim 1, and by a method with the features of claim 10.

The apparatus in accordance with the invention for determining or detecting a target position deviation of two bodies is distinguished in particular in that the second measuring unit—i.e. the measuring unit with the reflector arrangement—has a camera to record images of the scattering area. In contrast to the solution known from EP 2 801 788 A1, the camera to record images of the scattering area in the solution in accordance with the invention is not provided on the first measuring unit, i.e. not on the measuring unit having means for generating at least one bundle of light beams and having the scattering area to scatter light striking the scattering surface. This has the advantage that the optical axis of the camera in the state in which the measuring units are placed on the bodies can be oriented perpendicularly or nearly perpendicularly to the scattering area. This is not possible in the solution known from EP 2 801 788 A1, as this would block the beam path of the bundle of light beams. A perpendicular or essentially perpendicular orientation of the optical axis of the camera to the scattering area has the advantage that no distortions of perspective occur, which must be compensated for with significant effort in the solution known from EP 2 801 788 A1 by analyzing the images or image data recorded by the camera.

Seen as a whole, with the apparatus in accordance with the invention, the target position deviation of the bodies can be simply and practically determined on the basis of the camera images of the scattering area, and specifically from the points of impact of the bundle of light beams on the scattering area respectively on the basis of the positions of impact of the bundle of light beams on the scattering area.

The evaluation unit is configured so as to determine, using the image data provided by the camera, at least one point of impact of the bundle of light beams reflected off the reflector arrangement onto the scattering area, and to detect or determine from the point of impact a deviation of the position of the first body from the target position of the first body, and/or a deviation in the position of the second body from a target position of the second body. In order to detect or determine from the point of impact the deviation in the position of the first body from a target position of the first body and the deviation in the position of the second body from a target position of the second body, the evaluation unit can be configured to determine the deviation or shifting of the point of impact on the scattering area of the bundle of light beams reflected off the reflector arrangement from a reference position or target position wherein the reference or target position is the position of the reflected bundle of light beams when the first body is in the target position for the first body and the second body is in the target position for the second body. The deviation or shift can be expressed e.g. in the form of coordinate differences quantifying the deviation of the position of the reflected beam of light on the scattering area from the reference or target position. In order to detect a deviation of the body or bodies from the target position or positions, it may also suffice that the evaluation unit be configured to display, in the event of a deviation from a reference or target position of the impact point of the bundle of light beams reflected from the reflector arrangement onto the scattering area, this deviation or shift, or to indicate such a deviation or shift e.g. by emitting a warning or notification signal. The position of the first or second body can be characterized or defined in particular by e.g. a body axis of the first or second body, such that, when reference is made to the position of the first body or second body, it is understood as meaning the position of the body axis of the first or second body e.g. in a predefined three-dimensional coordinate system. The body axis may be e.g. a longitudinal axis of the body, or any other arbitrary axis penetrating the body.

The first body and/or the second body may comprise any arbitrary body, the deviation of which from a target position in a three-dimensional coordinate system or three-dimensional spatial system can be detected or determined by means of the apparatus in accordance with the invention. In particular, the first and second bodies may be shafts connected to one another by means of a coupling, wherein the shafts in their target positions are aligned with one another such that an undesirable deviation from an aligned orientation can advantageously be determined by means of the apparatus in accordance with the invention. A deviation of the body or bodies may result e.g. from thermal expansion. One may think e.g. of a displacement of the shafts from an aligned orientation relative to one another in consequence of thermal expansion during the operation of the shafts. For technical systems, the apparatus in accordance with the invention can be used in particular in a monitoring capacity, sounding an alarm as soon as at least one of the bodies deviates from its target position, or deviates from its target position by at least a specified amount in at least one specified spatial direction. In particular, technical systems with two bodies that are subject to varying external influences, such as, e.g., marine propulsion systems, can advantageously be very effectively monitored using the apparatus in accordance with the invention.

To improve ease of use, the camera is mounted in one practical embodiment detachably on the reflector arrangement, or manually detachably on the reflector arrangement.

Especially preferable, the camera is mounted detachably on the reflector arrangement via a mounting bracket, respectively the camera is mounted detachably on a mounting bracket which is attached to the reflector arrangement. Further, the mounting bracket is attached in this case to a side of the reflector arrangement facing away from the scattering area. The mounting bracket enables a very stable, robust mounting to be achieved. Due to the attachment of the mounting bracket to a side of the reflector arrangement facing away from the scattering area, a disruptive influencing of the path of the bundle of light beams is simply and practically avoided.

In a further practical embodiment, the second measuring unit has a smartphone, wherein the camera is provided at the smartphone, respectively is the camera of the smartphone. Advantageously, as a mass-market consumer product, a smartphone can be acquired at a relatively reasonable cost, or is already in the possession of the user for other reasons.

The smartphone can also be advantageously mounted on the reflector arrangement via a mounting bracket attached to the reflector arrangement; the mounting bracket may be attached to a side of the reflector arrangement facing away from the scattering area, with the advantages described above.

In order to ensure ease of use in detecting a target position deviation, the smartphone is preferably mounted detachably on the mounting bracket, or preferably detachably and pivotably mounted to the mounting bracket. The smartphone can of course alternatively be mounted detachably or detachably and pivotably on the reflector arrangement without provision of the mounting bracket. Ease of use is especially advantageous in the "move", in which the display of the smart phone is intended to be visible by the user. In large machines with a short shaft, the system is mounted very close to the machine housing, such that the display is hardly legible, especially when the smartphone is mounted straight. For this reason, pivotability is highly advantageous. The smartphone is especially advantageously mounted transversely, in order that a greater range of pivotability can be achieved.

In a preferred embodiment, the smartphone may comprise the evaluation unit. Alternatively, the evaluation unit can also be formed as a data analyzer separate from the smartphone, or be provided in the form of an analysis module of an analysis system, or in any other form known to a person skilled in the art. The image data supplied by the camera can be transmitted to the evaluation unit through any type of data connection, e.g. via a Bluetooth data connection or a standard data transmission cable, or via any other standard data transmission connection known to a person skilled in the art.

In an especially practical embodiment of the apparatus, the first body is a first shaft and the second body is a second shaft, with the first measuring unit designed to be placed at a circumferential surface of the first shaft and the second measuring unit designed to be placed at a circumferential surface of the second shaft. The apparatus has at least one inclinometer to measure the angle of rotation of a rotated position of the first shaft and/or the second shaft. The evaluation unit is configured to determine the horizontal and/or vertical angular misalignment and/or the horizontal parallel misalignment and/or the vertical parallel misalignment of the first and/or second shaft with regard to a target position of the first and/or second shaft, using as a basis the angle of rotation measured in various rotated positions of the first and/or second shaft, and the point (or points) of impact of the bundle of light beams reflected off the reflector arrangement onto the scattering area in these rotated positions.

The number of different rotated positions of the first and/or second shaft around the axis of rotation of each shaft needed in order to detect or determine the horizontal angular misalignment and/or vertical angular misalignment and/or the horizontal parallel misalignment and/or vertical parallel misalignment of the first and/or second shaft with regard to a target position of the first and/or second shaft is at least five for a single shaft, inasmuch as only one of the shafts is moved to various different rotated positions, or at least three, if each of the two shafts is moved to various different rotated positions.

In the above, especially practical embodiment, the first measuring unit can preferably have a first inclinometer for measuring the angle of rotation of a rotated position of the first shaft, and the second measuring unit a second inclinometer for measuring the angle of rotation of a rotated position of the second shaft; the first or second inclinometer can in particular also be used to measure the play (so called "backlash") in a coupling connecting the two shafts with one another.

If the second measuring unit has a smartphone provided with a camera (see also above), the at least one inclinometer or the second inclinometer can be provided on the smartphone respectively the at least one inclinometer or the second inclinometer can be an inclinometer of the smartphone. In this way, the tilt measuring function using an inclinometer already available in an existing smartphone can advantageously be utilized to improve ease of use.

In the method for detecting a target position deviation of two bodies in accordance with the invention, a first measuring unit is placed on a first body of the two bodies, and a second measuring unit placed on a second body of the two bodies. A bundle of light beams is then generated using the first measuring unit, reflected onto a scattering area of the first measuring unit by means of a reflector arrangement on the second measuring unit, and at least one image of the scattering area is then recorded by a camera of the second measuring unit. The at least one image is evaluated in order to determine at least one point of impact (WV, PV) of the bundle of light beams reflected onto the scattering area by the reflector arrangement and to detect from this a deviation in the position of the first body from a target position of the first body and/or a deviation in the position of the second body from a target position of the second body.

The method in accordance with the invention is also distinguished in particular in that, in contrast to the solution known from EP 2 801 788 A1, the second measuring unit—i.e. the measuring unit with the reflector arrangement—has a camera to record images of the scattering area, or in that at least one image of the scattering area is recorded by a camera of the second measuring unit, going along with the advantages already described above.

In order the detect or determine the deviation in the position of the first body from a target position of the first body and/or the deviation in the position of the second body from a target position of the second body from the at least one point of impact, the method in accordance with the invention preferably determines or detects the deviation (respectively displacement) of the bundle of light beams reflected off the reflector arrangement onto the scattering area from a reference or target position on the scattering area. The reference or target position of the reflected bundle of light beams used is that provided when the first body is in the target position for the first body and the second body in the target position for the second body. To determine the reference or target position—once the first measuring unit has been placed on the first body and the second measuring unit placed on the second body—the camera of the second measuring unit records at least one image of the scattering area when the first body is in the target position for the first body and the second body is in the target position for the second body, and this image is evaluated in order to determine or detect the target or reference position on the scattering area. Insofar as the bodies are not yet located in their target positions, they are moved to those positions for this purpose.

The deviation or displacement may be stated e.g. in the form of coordinate differences quantifying the deviation between the position of the reflected light beam on the scattering area and the reference or target position. In order to detect a deviation of the body or bodies from the target position or positions, it can also suffice to display a deviation or displacement of the point of impact on the scattering area of the bundle of light beams reflected off the reflector arrangement from the reference or target area, or to indicate such a deviation e.g. by outputting a warning signal or a notification signal.

It is further advantageous in the solution in accordance with the invention that, by using a camera and a scattering area that is projected on the camera rather than an optical detector which the reflected bundle of light beams strikes directly, a particularly simple and flexible system can be realized. In particular, the camera used in this solution can be a mass-market product designed for consumer use, such as a photographic camera or a smartphone, which are relatively inexpensive to acquire or are already in the possession of the user for other reasons.

In one practical embodiment, the reflector arrangement has one rearward surface and a second rearward surface arranged at an angle to one another in order to reflect the bundle of light beams from the first rearward surface to the second rearward surface, and thence in the direction of the scattering area.

Preferably, the first and second rearward surfaces of the reflector arrangement are arranged approximately perpendicular toward one another, or the first and second rearward surfaces of the reflector arrangement are arranged approximately vertically toward one another, and the reflector arrangement is formed as a prism or Porro prism or triple prism.

Especially preferably, one of the surfaces of the reflector arrangement facing the first measuring unit is formed to reflect a portion of the bundle of light beams onto the scattering area and to transmit another portion of the bundle of light beams to the first rearward surface.

In a further practical embodiment, the bundle of light beams is a first bundle of light beams, and the means for generating the first bundle of light beams are also designed so as to generate a second bundle of light beams. The two bundles of light beams are emitted essentially in the same direction, but differ spectrally. A surface of the reflector arrangement facing the first measuring unit is formed as a color splitter, and is thus more reflective for the first bundle of light beams than for the second, and more transmissive for the second bundle of light beams than for the first. At least one first rearward surface of the reflector arrangement is provided in order to reflect the transmitting second bundle of light beams through the surface facing the first measuring unit.

An edge of the prism is preferably oriented essentially tangentially with regard to the circumferential surfaces of the shaft.

In one preferred embodiment, the scattering area is equipped with reference marks and/or the scattering area is provided with multiple graphical codes distributed across the scattering area (60A, 60B, 60C, 60D) in order to code data related to the scattering area and/or the measuring unit equipped with the scattering area.

The camera may preferably have a lens of fixed focal length.

Figure 2:
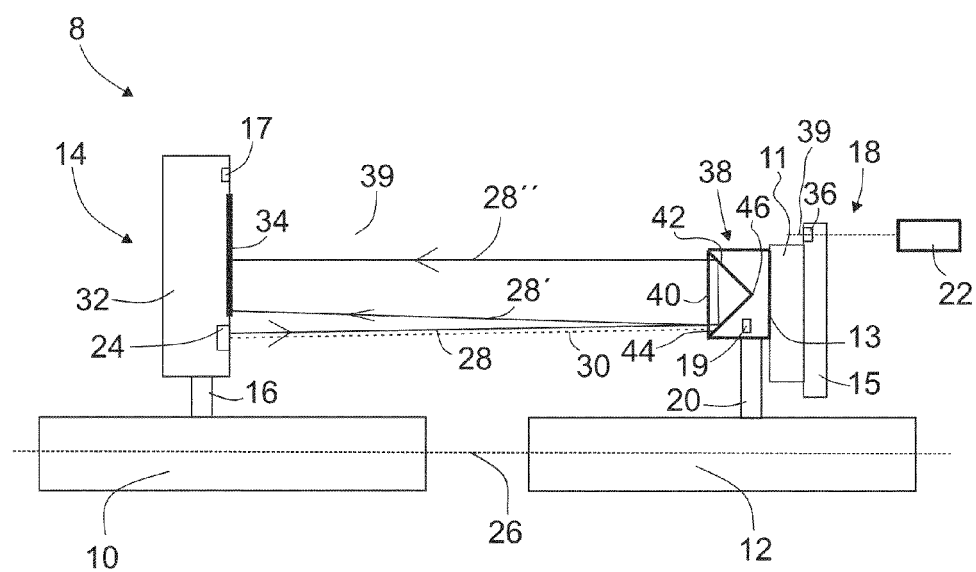
Figure 3:
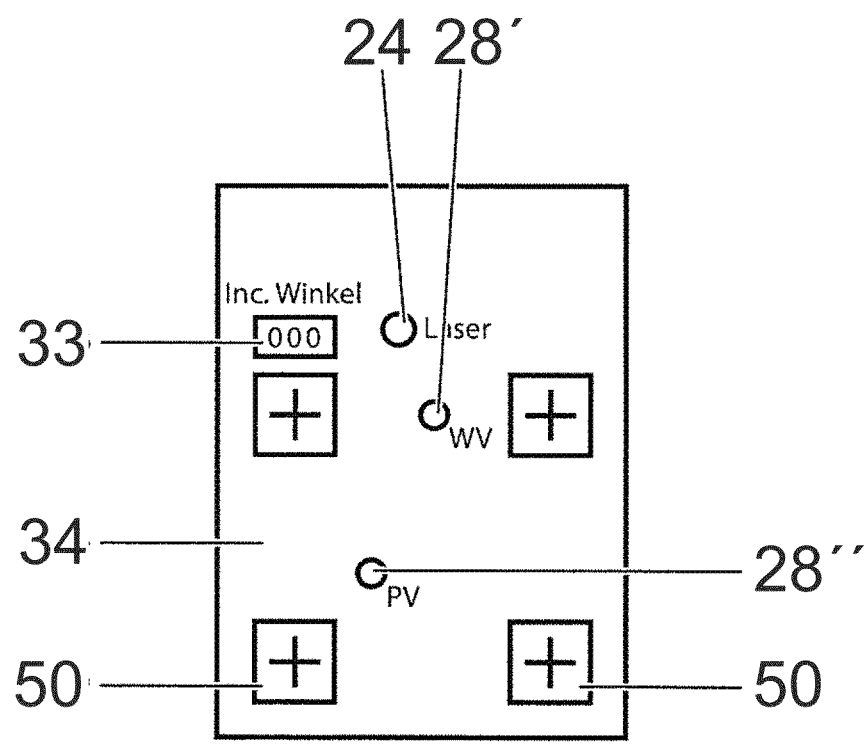
Figure 4:
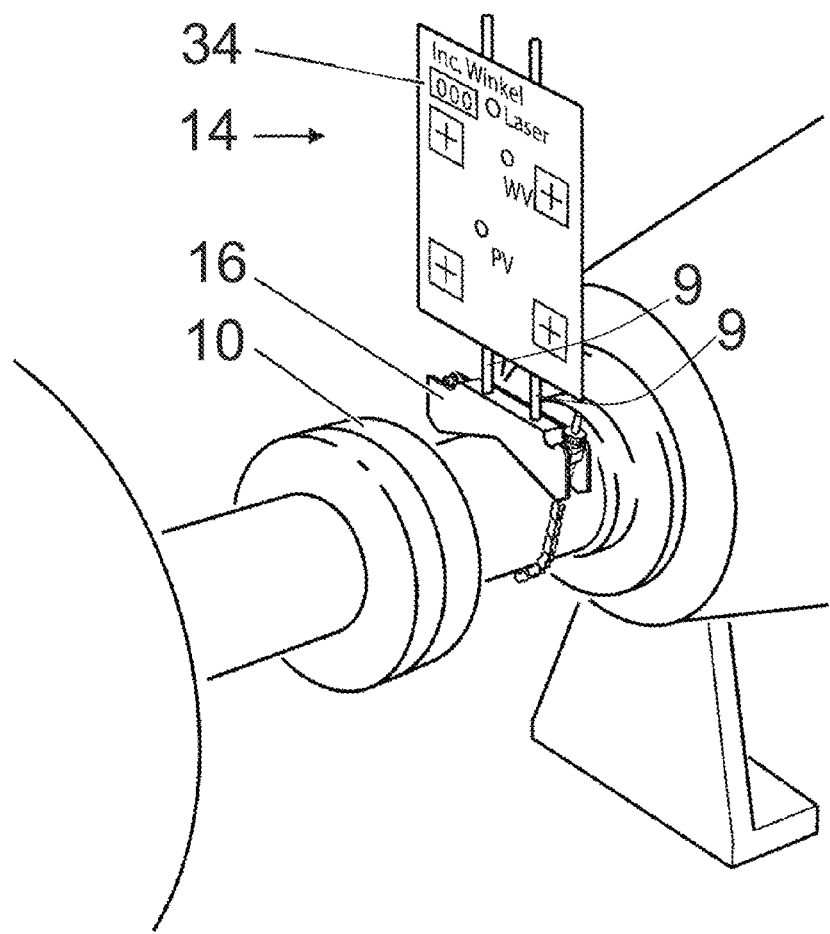
Figure 5:
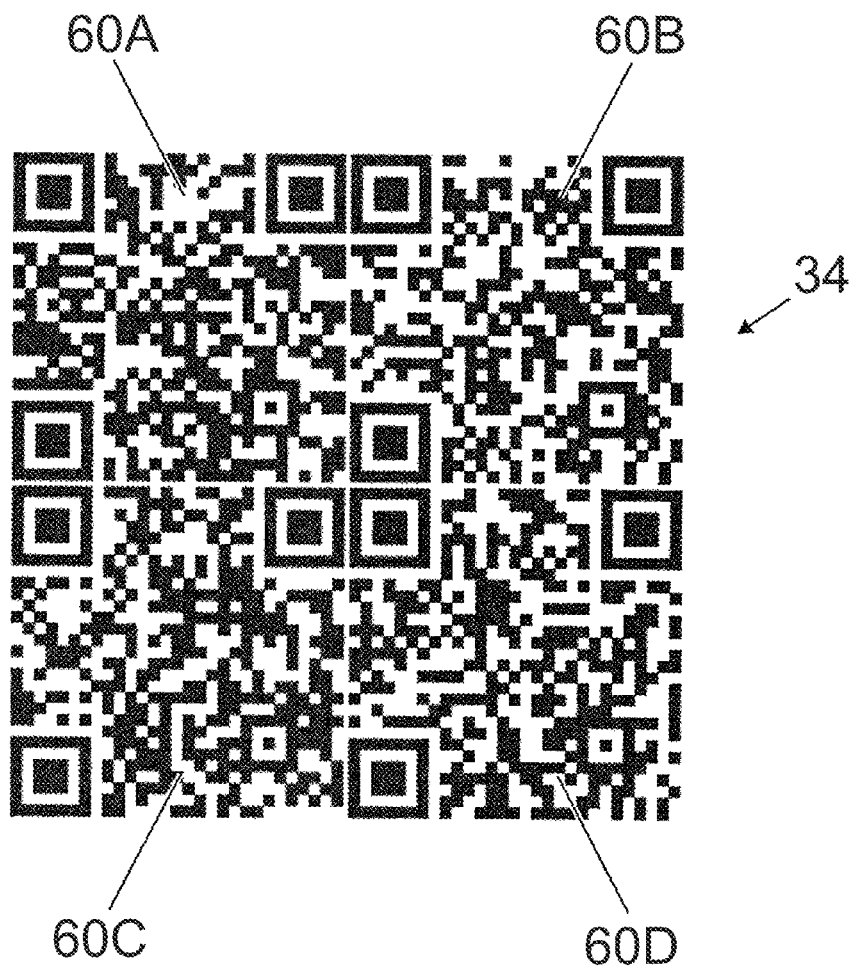

Exemplary embodiments of the invention are described in greater detail below on the basis of the attached drawing. Specifically, the illustrations show the following:

FIG. 1 a schematic side view of a first exemplary embodiment of an apparatus in accordance with the invention, FIG. 2 a schematic side view of a second exemplary embodiment of an apparatus in accordance with the invention;

FIG. 3 a frontal view of the scattering area of the apparatus in accordance with FIGS. 1 and 2;

FIG. 4 a perspective view of a first measuring unit of a further exemplary embodiment of an apparatus in accordance with the invention; and FIG. 5 an example of a scattering area equipped with four QR codes.

The apparatus 8 in accordance with FIG. 1 to determine the position of a first body 10 in the form of a shaft 10 and a second mechanical body 12 in the form of a shaft 12 relative to one another comprises a first measuring unit 14 for placement on the first body 10, a second measuring unit 18 for placement on the second body 12, and an evaluation unit 22. The first measuring unit 14 has an element 16 for placement on a circumferential surface of the shaft 10, and the second measuring unit 18 has an element 20 for placement on a circumferential surface of the shaft 12. These elements 16, 20 also have rods 9 (see FIG. 4, here illustrated only for element 16) for advantageous height adjustment. In particular the reflector arrangement 38 is mounted on these rods 9 so that the height of the former may be adjusted.

he first measuring unit 14 has a means 24 for generating a bundle of light beams 28; the means 24 is realized in the form of a light source 24 to generate laser light. In addition, the first measuring unit 14 has a scattering area 34 for scattering light striking the scattering area 34 (WV, PV—see also FIG. 3).

he second measuring unit 18 has a reflector arrangement 38 that faces the first measuring unit 14 when the measuring units 14, 18 are placed on the corresponding body 10, 12 in order to reflect the bundle of light beams 28 onto the scattering surface 34.

In addition, the second measuring unit 18 has a camera 36 to record images of the scattering area 34.

The second measuring unit 18 also has a smartphone 15, and the camera 36 is provided on the smartphone 15.

The smartphone 15 is attached to the reflector arrangement 38 by a mounting bracket 11 which is attached to the reflector arrangement 38. The mounting bracket 11 is attached to a side 13 of the reflector arrangement 38 facing away from the scattering area 34. The smartphone 15 is mounted detachably and pivotably on the mounting bracket 11.

The first body 10 is thus a first shaft 10, and the second body 12 is thus a second shaft 12.

The first measuring unit 14 is configured to be placed on a circumferential surface of the first shaft 10, and the second measuring unit 18 is configured to be placed on a circumferential surface of the second shaft 12.

The first measuring unit 14 has a first inclinometer 17 for measuring the angle of rotation of a rotated position of the first shaft 10, and the second measuring unit 18 has a second inclinometer 19 for measuring the angle of rotation of a rotated position of the second shaft 12. The measurement of the corresponding angle of rotation is thus performed by measuring the angle of inclination of the corresponding measuring unit 14, 18 by the relevant inclinometer 17, 19. Insofar as the evaluation unit 22 is implemented or installed in the smartphone 15, the angular values of the inclinometers 17, 19 are transmitted via Bluetooth to the smartphone 15 respectively the evaluation unit 22. A corresponding app can also be protected by the Bluetooth communication, as, otherwise, any arbitrary user with a laser pointer and a sheet of metal could use the app to perform measurements without authorization. The app could be designed such that, once dimensions have been entered, the measurement is performed by pressing "START" (or perhaps after a voice announcement).

The evaluation unit 22 is configured in order to determine from the image data supplied by the camera 36 at least one point of impact of the bundle of light beams 28 reflected off the reflector arrangement 38 onto the scattering area 34 in various rotated positions of the first and/or second shaft 10, 12, and to detect from the point of impact a deviation in the position of the first shaft 10 from a target position of the first shaft 10 and a deviation in the position of the second shaft 12 from a target position of the second shaft 12. If the shafts 10, 12 are located in their target positions, the shafts 10, 12 are oriented such as to be aligned with one another, respectively the shafts 10, 12 are aligned with one another in their target positions.

The evaluation unit 22 is further designed to determine the horizontal angular misalignment and/or the vertical angular misalignment and/or the horizontal parallel misalignment and/or the vertical parallel misalignment of the first and/or second shaft 10, 12 as compared to the target position of the first and/or second shaft 10, 12 on the basis of the angle of rotation of the first and/or second shaft measured in different rotated positions, and on the basis of the point(s) of impact of the bundle of light beams reflected off the reflector arrangement 38 onto the scattering area in these rotated positions.

The light source 24 is mounted so as to be rotatable upward and downward (not illustrated).

In an exemplary embodiment of a method (see FIG. 1) to detect the target position deviations of the two shafts 10, 12 relative to one another, the first measuring unit 14 is placed on the first shaft 10 and the second measuring unit 18 is placed on the second shaft 12. In addition, a bundle of light beams 28 is generated by means of the first measuring unit 14, the bundle of light beams 28 is reflected off a reflector arrangement 38 of the second measuring unit 18 onto a scattering area 34 of the first measuring unit 14. At least one image of the scattering area 34 is made by the camera 36 of the second measuring unit 18, and the at least one image is analyzed in order to identify at least one point of impact (WV, PV) on the scattering area 34 of the bundle of light beams reflected off the reflector arrangement, and to determine from this a deviation in the position of the first body from a target position of the first body, and a deviation in the position of the second body from a target position of the second body.

In particular, images of the scattering area 34 can also be captured in different rotated positions of the shafts 10, 12, and these images can be evaluated in order to identify the point of impact in these various rotated positions of the bundle of light beams 28 reflected off the reflector arrangement 38 onto the scattering area 34, and to determine from this and from the angle of rotation of the various rotated positions measured by the inclinometers 17, 19 the horizontal angular misalignment and/or the vertical angular misalignment and/or the horizontal parallel misalignment and/or the vertical parallel misalignment of the first and second shaft relative to the target position of the first and/or second shaft 10, 12.

Depending on the smartphone and the camera optics, a minimum distance between the scattering area 34 and the camera 36 must be maintained so that the camera 36 can be properly focused. This distance may be large.

In the condition in which the measuring units 14, 18 are placed on the shafts 10, 12, the optical axis 39 of the camera 36 is oriented perpendicularly or essentially perpendicularly to the scattering area 34.

In their target positions, the two shafts 10 and 12 are positioned so as to be aligned in line with one another or as nearly aligned as possible with regard to a reference axis 26; the apparatus 8 with the two measuring units 14, 18 serves in particular to detect or determine a possible horizontal angular misalignment and/or a vertical angular misalignment and/or a horizontal parallel misalignment and/or a vertical parallel misalignment with regard to the reference axis 26. The apparatus typically also comprises means to indicate the result in particular with regard to angular misalignment or parallel misalignment (not shown in the illustrations).

In addition to the light source 24 to generate the bundle of light beams 28, the first measuring unit 14 also comprises a collimator (not shown) to collimate the bundle of light beams 28.

The camera 36 has optics (not shown) to project the scattering area 34 on a camera sensor (not shown). The scattering area 34 faces the second measuring unit 18 when the two measuring units 14, 18 are in a measuring position. The light source 24 may also (not shown here) be positioned behind the scattering area 34 as seen from the second measuring unit 18 and emit the bundle of light beams 28 through a corresponding opening in the scattering area 34.

The reflector arrangement 38 has a first rearward surface 42 and a second rearward surface 44; the rearward surfaces 42, 44 are arranged at an angle to one another, typically a right angle, thereby forming an edge 46 between themselves; in the examples shown, the reflector arrangement is formed as a Porro prism (also referred to as a "roof prism"), in which the two parallel lateral surfaces of the prism are formed by congruent right triangles connected by the boundary surfaces positioned at right angles to the triangle surfaces. The edge 46 is positioned essentially at a tangent to the circumferential surfaces of the shafts 10, 12.

Behind the scattering area 34 (as viewed from the second measuring unit 18), the first measuring unit 14 has a housing 32 containing the light source 24 and the associated electronics. The light source 24 is preferably randomly pulsed, in order to minimize susceptibility to oscillation. In addition, the housing 32 contains the power source (batteries or battery packs) for the light source 24 and suitable power management electronics. In total, the housing 32 should not be significantly thicker than the rods 9 provided for connecting to the positioning element 16 (see FIG. 4).

The inclinometer 17 with a display 33 (see FIG. 3) may be integrated e.g. into the housing 32, see FIGS. 1 and 2. The inclinometer 17 may be formed e.g. as a MEMS inclinometer.

The first measuring unit 14 is preferably formed such that the bundle or bundles of light beams 28, 30 are aimed directly at the reflector arrangement 38 of the second measuring unit 18 without interposition of a reflecting element, i.e. no reflecting elements are arranged between the light source 24 and the reflector arrangement 38.

The exemplary embodiment in accordance with FIG. 2 is distinguished from the exemplary embodiment in accordance with FIG. 1 in that the reflector arrangement 38 has a front surface 40. This front surface 40 is formed as a partially reflective surface for the bundle of light beams 28; a first portion 28' of the bundle of light beams is reflected off the front surface 40 in the direction of the scattering area 34, while a second portion 28" of the bundle of light beams 28 is transmitted through the front surface 40 in the direction of the second rearward surface 44 to be reflected from the second rearward surface 44 to the first rearward surface 42, and from there through the front surface 40 in the direction of the scattering area 34.

In the exemplary embodiments, the points of impact (i.e. the points of light) of the bundles of light beams 28' and 28" on the scattering area 34 are denoted with WV and PV. The reflectivity of the front surface 40 for the bundle of light beams 28 is preferably chosen such that the intensities of the two reflected bundles of light beams 28' and 28" differ, thus enabling the two impact points WV and PV on the scattering area 34 to be distinguished from one another.

In accordance with a modified embodiment, the arrangement in accordance with FIG. 2 may be equipped with a light source 24 which can emit a second bundle of light beams 30 (depicted in FIG. 2 with dashed line) in addition to the first bundle of light beams 28, such that the two bundles of light beams 28, 30 are emitted in generally the same direction, but differ in terms of their spectrum (e.g. the light source 24 can be formed as a dual-wave laser diode emitting a bundle of light beams at a wavelength of approximately 660 nm in the red spectrum and a bundle of light beams at approximately 780 nm in the infrared spectrum; alternatively, the light source 24 can also have two laser diodes of different colors).

In this case, the front surface 40 of the reflector arrangement 38 is formed as a color splitter; it may be formed e.g. so as to be more strongly reflective for the first bundle of light beams 28 than for the second bundle of light beams 30, and correspondingly more transmissive for the second bundle of light beams 30 than for the first bundle of light beams 28. The bundle of light beams designated in FIG. 2 as 28" then corresponds to the second bundle of light beams 30 after it has been transmitted from the front surface 40 and reflected by the two rearward surfaces 42, 44. The bundle of lights beams designated as 28' in FIG. 2 then corresponds to the first bundle of light beams 28 reflected on the front surface 40.

The two impact points WV and PV thus differ in this way in their spectral composition, and can be easily distinguished by means of a color sensitive camera 36.

In the arrangement shown in FIG. 2, the point of impact WV (see FIG. 3) of the bundle of light beams 28' reflected off the front surface 40 represents a measure of the angular misalignment of the two shafts 10, 12, and the point of impact PV of the bundle of light beams 28" reflected off the two rearward surfaces 42, 44 represents a measure of the parallel misalignment of the two shafts 10, 12.

The scattering area 34 (see FIG. 3) is provided with measurement marks 50, which may be formed e.g. as crosses, in order to simplify the evaluation of the images of the scattering area 34 recorded by the camera 36. An external light source, such as an LED (not shown), may be provided so that the marks 50 are also visible in a dark environment. An external light source with an LED to illuminate the scattering area may in particular also be provided on the smartphone 15. Alternatively, background illumination (not shown) of the scattering area 34 may be provided. For example, a sheet of metallic foil with suitable cutouts could be glued to a frosted glass surface (made of glass or plastic), thus bringing in diffuse white light through the housing 32. The scattering area 34 is preferably formed so as to be flat or essentially flat.

The scattering area 34 may be displaced rearward (not shown) to enable better transfer of the weight for a tensioning device (see also FIG. 4). Also provided is a circuit board (not shown) with a hole for a light sensor (at very bottom—not shown) and Bluetooth. The light sensor is used to adjust the laser output to the ambient light level.

In the apparatuses in accordance with FIGS. 1 and 2, the camera 36 is arranged and equipped so as to depict the scattering area 34 completely or as completely as possible on the camera sensor.

Preferably, the optics of the camera 36 comprises fixed lenses. Alternatively, the camera 36 of the smartphone 15 may also have a zoom lens. The resolution of the camera is preferably at least 8 megapixels. The camera is preferably operated in macro mode.

As the camera 36 is formed as a smartphone 15, or the camera 36 is the camera 36 of a smartphone 15, the display of the smartphone can advantageously be used as a graphical user interface (GUI); otherwise, an additional device of this type, such as e.g. a smartphone or a tablet computer, could additionally be used for operator control. Voice operation with a headset or with "Google GLASS" could also be used, for example.

The camera 36 of the apparatuses in accordance with FIGS. 1 and 2 is preferably equipped with an OCR function to detect the angle of inclination displayed on the display of the inclinometer 17 or 19; alternatively, the angular value can be transmitted directly to the camera 36, e.g. via a Bluetooth link.

As the camera 36 is the camera 16 of a smartphone 15, the inclinometer typically integrated therein can also be used to determine the angle of inclination.

In evaluating the images recorded by the camera 36, a correction can be made of systematic image errors of the type which can be caused e.g. by the prism edge 46.

The evaluation of the images is performed in the schematically illustrated evaluation unit 22 which may comprise a part of the camera, in particular if the camera 36 is provided on the smartphone 15, which inherently offers a relatively large computing capacity.

Prior to the start of a measurement using the apparatus in accordance with FIG. 2, the two measuring units 14, 18 are first adjusted relative to one another so that the reflected bundles of light beams 28', 28" impact approximately in the center of the scattering area 34 (not depicted in FIG. 2). For this purpose, e.g. the second measuring unit 18 may be provided with a height adjustment mechanism (not shown) to adjust the position of the second measuring unit 18 in a radial direction in relation to the shaft 12 and with an angular adjustment mechanism for tilting the second measuring unit 18 in relation to the radial direction of shaft 12 and with an adjustment of the second measuring unit 18 about the radial direction.

Once the two measuring units 14, 18 have been adjusted relative to one another, the points of impact of the reflected bundles of light beams 28', 28" in principle indicate the misalignment of the two shafts 10 and 12 relative to one another when the two shafts 10 and 12 together with the measuring units 14, 18 thereon are rotated about the axis 26; the path of each point of impact depending on the angle of rotation (which in turn can be determined by means of the inclinometer function) can then be observed and analyzed in the normal way in order to determine the horizontal angular misalignment and/or the vertical angular misalignment and/or the horizontal parallel misalignment and/or the vertical parallel misalignment of the shafts 10, 12, in particular with regard to the target position of the first and second shaft 10, 12 (such a method is described e.g. in DE 39 11 307 A1 for a single bundle of light beams).

If the reflector arrangement 38 of the apparatus in accordance with FIG. 2 is configured as a triple prism, the point of impact of the bundle of light beams 28" reflected by the rearward surfaces 42, 44 indicates the parallel misalignment in both directions.

After the misalignment or target position deviations have been determined, an adjustment of the shafts 10, 12 is made in a particular angular position; measurements are carried out during this adjustment of the shafts in order to establish when the misalignment has been most effectively corrected. Such a method is also described e.g. in DE 39 11 307 A1.

If a triple prism is used the adjustment of the shafts can be performed e.g. in the "12 o'clock" position of the two measuring units 14, 18. If a Porro prism (also known as a "roof prism"), the adjustment can be made e.g. in the 3 o'clock or 9 o'clock positions.

During the orientation measurement process and while adjusting the shafts, the camera typically records images of the scattering area 34 continuously and at a relatively high rate; e.g. five images can be recorded and processed per second. As the camera is a smartphone, or the camera is the camera of a smartphone, the creation and evaluation of the images can be carried out e.g. in the form of a suitable app (see also above).

As an alternative to the continuous recording of images, the recording mode can e.g. also be selected such that an image is taken based on the current angle of inclination, e.g. whenever the angle changes by a certain amount, e.g. 1°.

The apparatuses in accordance with FIGS. 1 and 2 can optionally comprise a Bluetooth headset worn during the alignment process by the operator tasked with aligning the shafts and serving to wirelessly receive the misalignment values being calculated by the evaluation unit 22 in order to provide them in acoustic form to the person responsible for making the adjustment. This is advantageous inasmuch as it is typically difficult for the operator to read the display on the smartphone 15 during the adjustment process. The headset could also be used to utilize the Bluetooth connection for voice control of the smartphone 15.

Alternatively, the operator could make use of a second smartphone or a tablet computer to show the display of the smartphone 15 serving as the camera via a Bluetooth connection (e.g. using VNC) in a manner more easily legible for the operator; the smartphone 15 could also be controlled through the second smartphone or the tablet computer by operating the touch screen, see also WO 97/36146.

The projected surface typically measures approximately 40×40 mm; a pixel thus corresponds to about 20 μm if the resolution of the camera is 8 megapixels (corresponding to a vertical resolution of approximately 2,500 pixels). If, alternatively, a compact camera with e.g. 16 megapixels is used, a resolution of about 7 μm can be attained.

Alternatively, it is fundamentally possible for a camera with a special lens to be used, or, in the case of the smartphone used here, a magnifier can be placed in front of the smartphone. The dimensions of the scattering area 34 to be displayed can also be reduced, e.g. to a range of 20×20 mm to 30×30 mm.

It is fundamentally conceivable that the images from the camera 36 are transmitted wirelessly (e.g. via WiFi), e.g. to a mobile platform. A special SD card could e.g. be used in this case.

The use of a smartphone as the camera fundamentally provides many advantages: such devices are very flexible and powerful in terms of the programming and design of the graphical user interface; in particular, such things as gesture recognition, display of a keyboard and localization are possible. In addition, the user performing the orientation measurement is able to use a device the operation of which is already very familiar to him. Smartphones also offer many interfaces, e.g. also in a maintenance database; in particular, wireless interfaces are available which can be used to connect to a further mobile operating platform, a headset (with echo and noise suppression), Google Glass, a vibration belt, etc. Furthermore, the smartphone can be used in the normal manner during periods in which it is not being used for orientation measurements.

In accordance with one embodiment of the invention, the scattering area 34 is equipped with multiple two-dimensional optical codes, e.g. a QR code, distributed across the scattering area typically in a grid pattern; these are printed on the scattering area and serve to encode information/data regarding the scattering area or the measuring unit equipped with the scattering area, such as the serial number of the measuring unit, the dimensions in the X and Y axes of the scattering area (e.g. in mm), correction factors regarding the precision or errors of the printer used for printing the scattering area (e.g. the values for elongation or compression in the X and Y directions), the number of codes on the scattering area, the position of each code in the grid (line and column number), and the distance of each code from the point of origin of the coordinate system of the scattering area (e.g. in μm). The individual codes can be arranged e.g. so as to touch one another and cover the entire scattering area, see e.g. FIG. 5, in which four codes 60A, 60B, 60C, 60D are shown. The number and resolution of the codes should be optimized to reflect the resolution of the printer and the camera. Rather than a QR code, other proprietary graphical codes may in principle also be utilized.

The provision of graphical codes on the scattering area 34 has the following advantages: it is not necessary to photograph the entire reflector surface with a safety margin, simplifying the task of the operator. The codes can be reconstructed in order to generate a target image so that sufficient point values are available for linearizing the images of the scattering area (inner and outer parameters). The codes on the scattering area can be identified as such on the basis of particular marks. Greater position can be achieved in determining the point of impact. The scattering area can be corrected with regard to the precision of the printer used to print on the scattering area.

The invention claimed is:

1. Apparatus (8) for detecting a target position deviation of two bodies (10, 12), with a first measurer (14) to be placed on the first body (10), a second measurer (18) to be placed on the second body (12), and an evaluator unit (22);

wherein the first measurer (14) has means (24) to generate at least one bundle of light beams (28) and a scattering area (34) to scatter light (WV, PV) striking the scattering area;

wherein the second measurer (18) has a reflector arrangement (38) that faces the first measurer (14) when the measuring units (14, 18) are placed on the corresponding bodies (10, 12) in order to reflect the bundle of light beams (28) onto the scattering area (34), and wherein the second measurer (18) has a camera (36) to record images of the scattering area (34);

wherein the evaluator (22) is configured to determine at least one point of impact on the scattering area (34) of the bundle of light beams (28) reflected off the reflector arrangement (38) from the image data supplied by the camera (36) and to detect from the point of impact a deviation in the position of the first body (10) from a target position of the first body (10) and a deviation in the position of the second body (12) from a target position of the second body (12).

2. Apparatus in accordance with claim 1, characterized in that the camera (36) is mounted removably on the reflector arrangement (38).

3. Apparatus in accordance with claim 2, characterized in that the camera (36) is mounted removably on the reflector arrangement (38) by a mounting bracket attached to the reflector arrangement (38), wherein the mounting bracket is attached to a side of the reflector arrangement (38) facing away from the scattering area (34).

4. Apparatus in accordance with claim 1, characterized in that the second measurer (18) has a smartphone (15), wherein the camera (36) is provided on the smartphone (15).

5. Apparatus in accordance with claim 4, characterized in that the smartphone (15) is mounted on the reflector arrangement (38) by a mounting bracket (11) attached to the reflector arrangement (38), wherein the mounting bracket (11) is attached to a side (13) of the reflector arrangement (38) facing away from the scattering area (34).

6. Apparatus in accordance with claim 5, characterized in that the smartphone (15) is mounted removably on the mounting bracket (11).

7. Apparatus in accordance with claim 5, characterized in that the smartphone (15) is mounted removably and pivotably on the mounting bracket (11).

8. Apparatus in accordance with claim 4, characterized in that the smartphone (15) comprises the evaluator (22).

9. Apparatus in accordance with claim 1, characterized in that the first body (10) is a first shaft (10) and the second body (12) is a second shaft (12), wherein the first measurer (14) is configured to be placed on a circumferential surface of the first shaft (10) and the second measurer (18) is configured to be placed on a circumferential surface of the second shaft (12), wherein the apparatus has at least one inclinometer (17, 19) for measuring the angle of rotation of a rotated position of at least one of: the first shaft (10) and the second shaft (12), wherein the evaluator (22) is configured to determine at least one of: the horizontal angular misalignment, the vertical angular misalignment, the horizontal parallel misalignment and the vertical parallel misalignment of the first and second shaft relative to a target position of the first and second shaft (10, 12) on the basis of the angle of rotation measured in different rotated positions of at least one of the first and second shafts, and on the basis of the point of impact on the scattering area (34) of the bundle of light beams reflected off the reflector arrangement (38) in these rotated positions.

10. A method for detecting a target position deviation of two bodies (10, 12), wherein a first measurer (14) is placed on a first body (10) of the two bodies (10, 12), and a second measurer (18) is placed on a second body (12) of the two bodies (10, 12), a bundle of light beams (28) is generated by means of the first measurer (14), the bundle of light beams (28) is reflected onto a scattering area (34) of the first measurer (14) by means of a reflector arrangement (38) of the second measurer (18), at least one image of the scattering area (34) is recorded by a camera (36) of the second measurer (18), and the at least one image is evaluated in order to determine at least one point of impact (WV, PV) on the scattering area (34) of the bundle of light beams reflected off the reflector arrangement, and to detect from it a deviation in the position of the first body from a target position of the first body and a deviation of the position of the second body from a target position of the second body.

11. Apparatus in accordance with claim 5, characterized in that the smartphone (15) comprises the evaluator (22).

12. Apparatus in accordance with claim 6, characterized in that the smartphone (15) comprises the evaluator (22).

13. Apparatus in accordance with claim 7, characterized in that the smartphone (15) comprises the evaluator (22).

* * * * *